Dec. 17, 1968     C. H. OVERBAY     3,416,232
CHORD DETERMINING TOOL
Filed Aug. 23, 1966
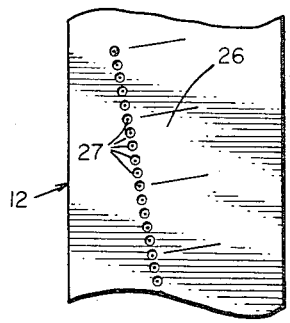
FIGURE 3
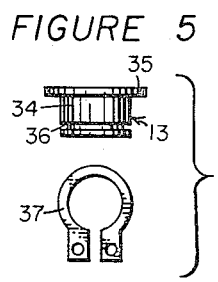
FIGURE 5
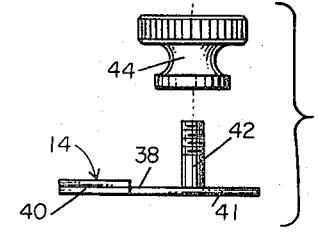
FIGURE 6
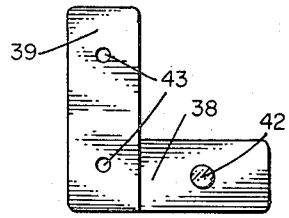
FIGURE 7
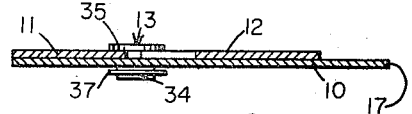
FIGURE 2
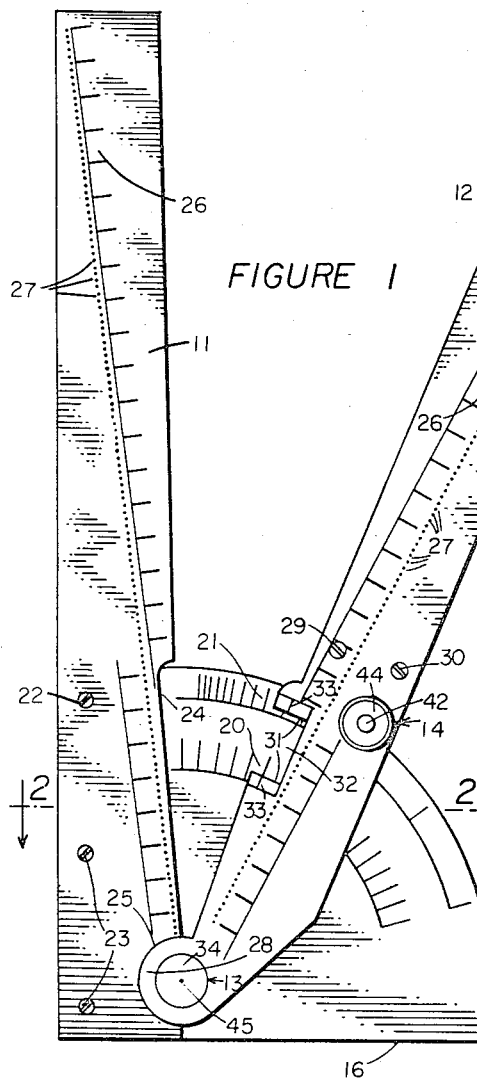
FIGURE 1
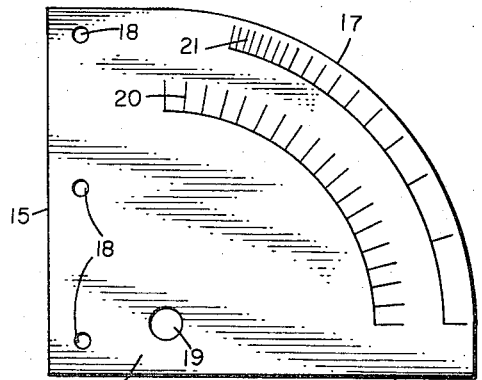
FIGURE 4
Charles H. Overbay, INVENTOR.
BY *[signature]*
ATTORNEY.

United States Patent Office 3,416,232
Patented Dec. 17, 1968

3,416,232
CHORD DETERMINING TOOL
Charles H. Overbay, Rte. 1, Box 210,
Benton City, Wash. 99320
Filed Aug. 23, 1966, Ser. No. 574,326
1 Claim. (Cl. 33—75)

ABSTRACT OF THE DISCLOSURE

A quadrant protractor having one stationary arm and one pivotable arm with scales thereon adapted to indicate chords subdividing a circle. The scales have division indicated by conical indentations and the movable arm is adjustably fixable relative the protractor body.

My invention relates generally to a tool of precision for determining the length of chord of a circle of given radius divided into a given number of equal parts.

In machine shop practice it is oftentimes necessary to determine the chord distance of a number of spaced points on a circle of given radius. This need has long existed and heretofore various manual and machine methods of accomplishing it have become known. My invention relates particularly to such a chord determiner adapted for use with a pair of dividers and more particularly to such a tool of the two armed protractor type. Heretofore it has become known to use such a two-armed protractor type tool to aid in accomplishing this function, but the purpose of the instant invention is to provide such a tool of a particular style and design that render it more economical, more durable and more accurate than the chord determiners heretofore known. In so doing it is:

A principal object of my invention to provide a two-arm chord determiner with arms coplanar and movable relative each other.

A further object of my invention to provide a tool of the nature aforesaid that has small conical holes at its various measuring points where dividers would be applied thereto so as to provide a firm non-slipping point of measure.

A further object of my invention to provide a tool of the nature aforesaid with the principal body portion on the same side of the pivot point as the measuring arms, to provide a compact tool not easily brought out of adjustment by accidental injury.

A further object of my invention to provide such a tool with the radially extending scales angled relative the measuring arm axis, so that the scales are not interfered with by arm boundaries.

A still further object of my invention to provide such a tool that is of new and novel design, of simple and economic manufacture, of rugged and durable nature, and one that is otherwise well adapted to the uses for which it is intended.

These and other objects of my invention will become apparent from a consideration of the following specification and accompanying drawings which form a part of this application.

In carrying out the objects of my invention, however, it is to be understood that its essential features are susceptible of change in design and structural arrangement, with only one preferred practical embodiment being illustrated as required.

In the accompanying drawings, wherein like numbers of reference refer to similar parts throughout:

FIGURE 1 is an orthographic plan view of my invention showing its various parts, their configuration and relationship from this aspect.

FIGURE 2 is a partial orthographic cross-sectional view of the device of FIGURE 1 taken on the line 2—2 thereon, in the direction indicated by the arrows.

FIGURE 3 is an enlarged orthographic sectional view of a portion of one of the measuring arms of my invention, showing particularly the conical depressions for alignment of divider points.

FIGURE 4 is an orthographic view of the body portion of my device that carries measuring scales.

FIGURE 5 is an orthographic view of the pivot pin and retaining ring of my device.

FIGURE 6 is an orthographic side view of the adjustable arm fastener of my device.

FIGURE 7 is an orthographic plan view of the adjustable arm fastener of FIGURE 6, taken on the line 7—7 thereon in the direction indicated by the arrows.

Referring now to the drawings in greater detail and particularly to that of FIGURE 1, it will there be seen that my invention includes, generally, a quadrant body 10 carrying immovable chord arm 11 and pivotable chord arm 12 journaled on body 10 by pin 13 and adjustably positionable thereon by pivot arm fastener 14.

As appears in FIGURE 4, body 10 is a planar member shaped as the quadrant of a circle having radii 15, 16 and curved periphery 17. Tapped holes 18 are provided at spaced distances inwardly of radii 16 to cooperate in fastening immovable chord arm 11. A hole 19 is provided near the apex portion of the body to pivotably receive pin 13. Angle scale 20 and equal division scale 21 are provided on the body member inwardly adjacent the circular periphery 17 to determine the angular relationship between the chord arms 11, 12. These scales are established by the geometric relationships to determine angular measurements from the center of hole 19.

Immovable chord arm 11 is the planar, rectangular, elongate member illustrated, with holes 22 positioned to cooperate with the holes 18 of body 10 to threadedly receive bolts 23 therebetween to fasten arm 11 on body 10 in releasable structural engagement. Arm 11 on its inwardly-facing side, in the part over body 10, has the indentation 24 adapted to receive corresponding protuberance 31 of movable chord arm 12. The area immediately adjacent pin 13 has pin indentation 25, adapted to pivotably receive pin ear 28 of the pivotable arm. A chord scale 26 is provided, as hereinafter more particularly described, along immovable chord arm 11. At each normal measuring point of this scale, a small conical hole 27 is provided in position such that the apex of this hole is immediately over the particular point to be measured so that by reason of its shape, the point of a divider placed therein will automatically assume the proper position for measurement.

Pivotable arm 12 is a structure similar to immovable arm 11 with an identical chord scale 26 having the same conical holes 27 as on immovable arm 11. Two holes 29 are positioned to threadedly receive bolts 30 extending therethrough to fasten pivot arm fastener 14 to the underside of the pivot arm. Another appropriately positioned hole is provided to rotatably receive the shank of setting screw 42 of pivot arm fastener 14. On the inward edge, or that facing immovable arm 11, a protuberance 31 is provided with window 32 to aid in reading index marks 33 carried on the edge thereof. That is to say, with the index mark positioned as illustrated the scale may be seen on both sides thereof so as to make it more understandable and alignment of index and scale marks more simple. Protuberance 31 is desirable in this structure so that window 32 will not remove any of the markings on chord scale 26. A protruding circular pin ear 28 is provided in the lowermost portion of pivotable chord arm 12 to receive the pivot pin 13; the configuration of this protuberance is such as to be pivotably received in indentation 25 of immovable chord arm 11.

Pivot pin 13 with its fastener is illustrated in FIGURE 5, where it is seen to comprise body 34 with relatively thin enlarged head 35 and opposed fastener groove 36. Fastener 37 is an elastically deformable split ring, of the type illustrated and well known in the art, adapted to releasably maintain pin 34 in an appropriate bore. The distance between the adjacent surfaces of head 35 and fastener 37 is such as to allow a manually movable rotation of pivot arm 12 relative to body 10.

Pivot arm fastener, illustrated in FIGURES 6 and 7, comprises L-shaped body member 38 with filler 39 carried on arm 40 and perpendicularly projecting setting screw 42 carried on arm 41. Filler 39 very nearly approximates thickness of body 10. Appropriately positioned holes 43 are provided to cooperate with holes 29 of pivot arm 12 to threadedly receive bolts 30 therethrough to fasten the fastening member to the underside of pivot arm 12 with setting screw 42 projecting upwardly through an appropriate hole in the pivot arm with arm 41 extending over body 10 near curved periphery 17. Knurled cap 44 is provided to engage the threaded end portion of screw 42 on the upper side of arm 12. With this arrangement, as the knurled cap 44 is tightened, fastener arm 41 will move elastically and be brought into more forceful surface engagement with body 10 to thus create more friction between pivotable arm 12 and body 10 to adjustably position the pivotable arm as desired.

The positioning of the various scales of my device is somewhat critical, but the methods are well known in the art. Chord scales 26 extend in straight lines as radii of a circle with center at the center of rotation of pin 13. The scales are angled relative the longer dimension of arms 11, 12 so that the arms may close but yet provide area for the scale. The scale length is subdivided by units habitually used in the machining art to determine linear measure. Angle scale 20 is so positioned and designed as to indicate the angular relationship between scales 26. Equal division scale 21 is so designed and positioned as to indicate the angularity between adjacent points when a circle of given radius be divided into the number of parts indicated. Obviously, since the index line 33 is not co-linear with either of chord scales 26, this fact must be appropriately considered in positioning the scales. The upper surface of arms 11 and 12 are substantially coplanar, and holes 27 are of the same depth, so that the apex of each hole is co-planar with all others.

With this structure recited and the requirements imposed upon the various scales, the operation of my device now becomes obvious. To determine the length of chord between two adjacent points on a circle, the chord arms 11, 12 are set from known information either with the central angle between said points as determined by angle measure or the number of divisions of the circle, and the points of dividers established at the paired opposed points on the chord arms indicating the radii of the circle involved. The distance between these points will then be the desired chord length. With the divider so set at this distance, the distance may be transferred to the particular work by scribing the various points about the desired circle. If it be desired to establish the radius of a particular circle, this may also be done with the device by establishing one point of the dividers at the pivot point 45 on the head of pin 13 and establishing the other divider point at the appropriate distance on one of the chord scales 26. The pivot point 45 would obviously be the zero index point of either chord scale.

With the structure recited it should be noted that the distance measured between divider points will be coplanar with chord scales 26. In other known instruments this is not the case and if the two chord arms be not co-planar, an error resulting from the angular relationship will be accentuated as measurements approach the pivot point.

It should be further noted that in the instant device with its structures recited, all scales and indicators are of a rugged, durable nature and on the same side of the pivot point as the chord arms so as to make an instrument of more compactness, greater durability and accuracy than one having index scales on the opposite side of the pivot point from the chord arms.

The foregoing description of my invention is necessarily of a detailed nature so that a specific embodiment of it may be set forth as required, but it is to be understood that the description is only a specific embodiment and that various modifications of detail, rearrangement and multiplication of parts may be resorted to without departing from its spirit, essence, or scope.

Having thusly described my invention, what I desire to protect by Letters Patent, and what I claim is:

1. A chord determining instrument of the nature aforesaid comprising, in combination:

a quadrant body carrying angle determining scales along the curved peripheral edge thereof;

an immovable chord arm structurally communicating with the quadrant body, said arm obliquely carrying a linear chord scale extending radially outward from a central pivot point in the quadrant body, the chord scale having conic indentations with the apex of each being coplanar and at a measuring point on the scale;

a movable chord arm adjustably, pivotably carried by the quadrant body, having a linear chord scale, with conic indentations with the apex of each being coplanar and at a measuring point on the scale, extending radially outward from the central pivot point in the quadrant body obliquely to the chord arm and indexing means to determine the relationship of the movable chord arm relative the angle determining scales carried by the quadrant body;

a pin mounting the movable chord arm for pivotable motion relative the quadrant body; and means of adjustably positioning the pivotable chord arm relative the quadrant body comprising an L shaped member having a filler on one arm and perpendicularly projecting stud on the other arm, the L shaped member positioned on the underside of the pivotable chord arm so that the stud carrying arm of the body communicates with the undersurface of the quadrant body with the stud projecting therethrough; and a knurled nut threadedly carried on the stud to increase the frictional engagement between the pivotable chord arm and the quadrant body to adjustably position the pivotable chord arm.

References Cited

UNITED STATES PATENTS

| 704,263 | 7/1902 | Luck | 33—75 |
| 932,907 | 8/1909 | Rydman | 33—75 |
| 2,659,977 | 11/1953 | Benkoe | 33—107 |

FOREIGN PATENTS

| 3,825 | 1894 | Great Britain. |
| 81,631 | 1/1920 | Switzerland. |
| 248,240 | 2/1948 | Switzerland. |

WILLIAM D. MARTIN, Jr., *Primary Examiner.*

U.S. Cl. X.R.

33—93, 115